United States Patent [19]
Kamen et al.

[11] Patent Number: 6,136,382
[45] Date of Patent: Oct. 24, 2000

[54] METHOD AND COMPOSITIONS FOR DECORATING VITREOUS ARTICLES WITH RADIATION CURABLE INKS HAVING IMPROVED ADHESION AND DURABILITY

[75] Inventors: Melvin Edwin Kamen, Highlands, N.J.; Dexin Luo, Brooklyn, N.Y.; Ming Hu, Piscataway, N.J.

[73] Assignee: Deco Patents, Inc., Edison, N.J.

[21] Appl. No.: 09/028,516

[22] Filed: Feb. 23, 1998

Related U.S. Application Data

[60] Provisional application No. 60/068,856, Dec. 29, 1997.
[51] Int. Cl.$^7$ ..................................................... C08J 7/04
[52] U.S. Cl. ........................ 427/511; 106/287.4; 427/515
[58] Field of Search ................................... 427/511, 515; 428/420; 106/277.14

[56] References Cited

U.S. PATENT DOCUMENTS

| | | |
|---|---|---|
| 3,922,436 | 11/1975 | Bell . |
| 4,356,233 | 10/1982 | Lange et al. ............................ 427/515 |
| 4,891,241 | 1/1990 | Hashimoto . |
| 5,006,573 | 4/1991 | Plueddemann . |
| 5,411,585 | 5/1995 | Avery et al. ........................ 106/287.14 |
| 5,562,969 | 10/1996 | Sakamoto . |
| 5,567,235 | 10/1996 | Carson . |

FOREIGN PATENT DOCUMENTS

| | | |
|---|---|---|
| 478 154 | 4/1992 | European Pat. Off. . |
| 53-84037 | 7/1978 | Japan ..................................... 427/511 |
| 07017785A | 1/1995 | Japan . |
| 848445 | 1/1961 | United Kingdom . |

OTHER PUBLICATIONS

Tegoglas T5 for the cold end coating of hollow glassware, Technical Bulletin Mar. 1975.
Huls, Applications of Organofunctional Silanes, Dynasylan, Aug. 1993.

*Primary Examiner*—John J. Gallagher
*Attorney, Agent, or Firm*—Pryor Cashman Sherman and Flynn, LLP; Maxim H. Waldbaum

[57] ABSTRACT

A primer composition for radiation curable inks comprising 75–99.99% water, 0.01–20% of a silane coupling agent having the general formula:

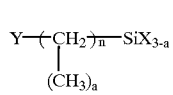

II.

and 0.001–20% of a nonionic surfactant which is a polyethylene glycol glyceryl fatty acid ester; a method for pre-treating a vitreous article prior to application of organic radiation curable decorative indicia with said primer composition; and a method for applying decorative indicia to the surface of a vitreous article comprising the steps of (a) applying to the surface of the article a primer composition containing a solvent and a coupling agent capable of forming a chemical bond between the surface of the vitreous article and an organic, radiation curable composition, (b) applying an organic radiation curable ink composition over the primer composition in a desired design, (c) curing the organic ink composition on the article by exposing it to the radiation by which it is curable, thereby causing the coupling agent to form a chemical bond between the surface of the vitreous article and the cured organic ink composition; and a method for pre-treating vitreous articles.

12 Claims, No Drawings

METHOD AND COMPOSITIONS FOR DECORATING VITREOUS ARTICLES WITH RADIATION CURABLE INKS HAVING IMPROVED ADHESION AND DURABILITY

This application is a continuation-in-part of a Provisional patent application serial No. 60/068,856, filed Dec. 29, 1997.

TECHNICAL FIELD

The invention is in the field of applying decorative indicia to substrates such as glass and other vitreous articles, and in particular, for pre-treating articles to be decorated with radiation curable inks to cause the inks to exhibit improved adhesion to the vitreous substrate.

BACKGROUND OF THE INVENTION

Commercial ceramic and glassware is often decorating by applying a pattern in colored ink on the surface of the substrate with screen printing, offset printing, or any other direct application technique. The glass is then baked at high temperatures to bond the indicia to the glass surface. This process, sometimes referred to as applied ceramic labeling (ACL), exhibits certain drawbacks. Often the ink compositions contain heavy metals and volatile organic solvents (VOC's). Both VOC's and heavy metals are undesirable from the environmental point of view. Second, ACL requires high temperature ovens for the baking step, which results in considerably energy usage and an increased potential for worker injury due to the high temperatures at which the process operates. Moreover, the high temperature ovens are expensive, cumbersome, pieces of equipment that require considerable floor space in factories.

On the other hand, use of radiation curable, particularly ultraviolet (UV) radiation curable, organic pigmented inks for decoration of glass and other vitreous materials is very desirable. Organic inks generally can be cured by exposure to radiation, such as UV radiation, thus obviating the need for high temperature baking. In addition, UV curable organic inks can be formulated to contain little or no VOC's or other nonaqueous solvents. One problem with organic inks is that they often do not exhibit adhesion equivalent to that obtained with ACL. Glass beverage and cosmetic containers must pass very stringent quality control tests, depending on the material which is sold in the container. For example, the decorative indicia on certain types of beverage bottles must be able to withstand pasteurization (exposure to water having a temperature of 70° C. for one hour), or exposure to solutions of caustic base for extended periods of time at elevated temperatures.

Thus, there is a continuing effort to formulate radiation curable inks and utilize decorating methods which provide decorative indicia having durability and adhesion equivalent to that of ACL.

An object of the invention is to provide a composition to be used for pre-treating vitreous articles prior to application of radiation curable inks to cause the inks to exhibit improved durability and adhesion.

An object of the invention is to provide a method for pre-treating vitreous articles with a composition which will cause the radiation curable inks subsequently applied to to the article, to exhibit improved adhesion and durability.

An object of the invention is to provide a method for decorating glass and other vitreous articles with radiation curable ink compositions which exhibit improved adhesion and durability.

SUMMARY OF THE INVENTION

The invention comprises a method for applying decorative indicia to the surface of a vitreous article comprising the steps of:

(a) applying to the surface of the article a primer composition containing a solvent and a coupling agent capable of forming a chemical bond between the surface of the vitreous article and an organic, radiation curable composition, (b) after the applied primer composition is substantially dry, applying an organic radiation curable ink composition over the primer composition in a desired design, (c) curing the organic ink composition on the article by exposing it to the radiation by which it is curable, thereby causing the coupling agent to form a chemical bond between the surface of the vitreous article and the cured organic ink composition.

The invention also comprises a method for pre-treating a vitreous article prior to application of organic radiation curable decorative indicia, comprising applying to said article a primer composition comprising, by weight of the total composition:

75–99.99% water, 0.01–20% of a silane coupling agent having the general formula:

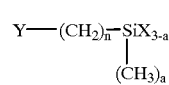

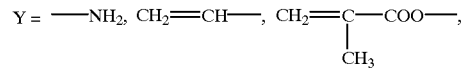

wherein n = 0–3
a = 0–2

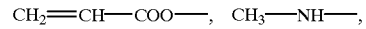

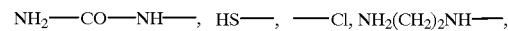

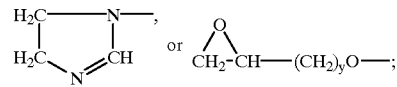

X is each independently —CH$_3$, —Cl, —OCOR', —OC$_2$H$_4$OCH$_3$, —(OC$_2$H$_4$)$_2$OCH$_3$, or —OR, where R is a C$_{1-20}$ straight or branched chain alkyl, and R' is a C$_{1-3}$ alkyl or alkenyl, wherein R and R' are preferably methyl or ethyl, and y is 1–3.

0.001–20% of a nonionic surfactant which is a polyethylene glycol glyceryl fatty acid ester.

The invention also comprises a primer composition for radiation curable inks comprising, by weight of the total composition:

75–99.99% water, 0.01–20% of a silane coupling agent having the general formula:

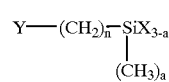

wherein n = 0–3
a = 0–2

-continued

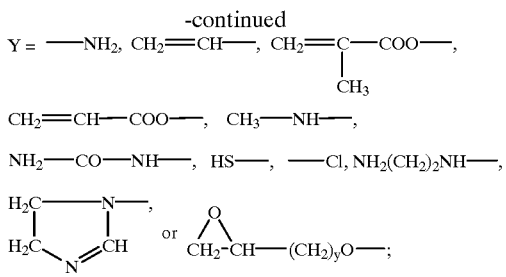

X is each independently —CH$_3$, —Cl, —OCOR', —OC$_2$H$_4$OCH$_3$, —(OC$_2$H$_4$)$_2$OCH$_3$, or —OR, where R is a C$_{1-20}$ straight or branched chain alkyl, and R' is a C$_{1-3}$ alkyl or alkenyl, wherein R and R' are preferably methyl or ethyl, and y is 1–3.

0.001–20% of a nonionic surfactant which is a polyethylene glycol glyceryl fatty acid ester.

DETAILED DESCRIPTION

All percentages mentioned herein are percentages by weight unless otherwise indicated.

The term "vitreous article" when used in accordance with the invention shall mean glass, ceramic, tile, and similar vitreous materials. The articles which may be decorated or printed according to the method of the invention may be in any shape or form, such as a container, sheet, tile, figurine, or the like. In the preferred embodiment of the invention the article is made of glass or ceramic and is a container, such as a cosmetic or beverage container. The method of the invention and the compositions used in the method are further described below.

THE COMPOSITIONS USED IN THE METHOD OF THE INVENTION

1. The Primer Composition

The primer compositions which are used to pre-treat the vitreous article prior to decoration with the radiation curable ink contain a solvent and a coupling agent capable of forming a chemical bond between the surface of a vitreous article and an organic radiation curable composition. The primer composition may also contain other ingredients such as surfactants, and other materials. Surfactants will improve the wettability and levelling capability of the primer composition, i.e. the primer composition is better able to wet the surface to which it is applied, and the radiation curable ink compositions will apply more evenly.

(a) The Solvent

The solvent may be aqueous or non-aqueous or a mixture of both types of solvents, provided the coupling agent is soluble in it. Suitable non-aqueous solvents include aliphatic or aromatic ketones such as acetone, diacetone alcohol, dihydroxyacetone, ethyl butyl valerolactone, methyl ethyl ketone, and the like; aliphatic or aromatic alcohols such as methanol, propanol, benzyl alcohol, butoxyethanol, butoxypropanol, butyl alcohol, 3-methyl-3-methoxybutanol, t-butyl alcohol, butylene glycol, diethylene glycol, abietyl alcohol, propylene carbonate, hexyl alcohol, isopropanol, and the like; glycol ethers; esters such as butyl acetate, ethyl acetate, etc. Also suitable as non-aqueous solvents are volatile linear or cyclic silicones such as cyclomethicone or dimethicone, or volatile paraffinic hydrocarbons. The primer composition comprises 75–99.99%, preferably 85–99.5%, more preferably 90–99% of the solvent, which is preferably water.

(b) The Coupling Agent

The coupling agent is a compound capable of forming a chemical bond between the surface of a vitreous article and the organic, radiation curable composition. The vitreous article is generally comprised largely of inorganic material which has free functional groups such as hydroxyl groups. Preferably, the bonding that occurs between the coupling agent and the inorganic surface is via the formation of hydrogen bonds mainly between the free hydroxyl groups of the inorganic substrate and the functional groups of the coupling agent. In some instances, the hydrophilic functional groups of the coupling agent are formed when the coupling agent comes into contact with water. For example, in the case where the coupling agent is an alkoxy silane, the alkoxy groups present in the silane tend to hydrolyze upon exposure to water to form hydroxyl groups, and thus the silane becomes a silanol. Preferably the functional groups of the coupling agent are hydrophilic groups such as hydroxyl, hydroxy-polyethyleneoxy, carboxylate, sulfonate, sulfate, phosphate, amine, or mixtures thereof. The coupling agent/solvent composition generally comprises 0.01–25%, preferably 0.05–15%, more preferably 0.1–10% of the coupling agent. While a variety of coupling agents will provide this type of bonding, the preferred coupling agents are silanes. In this case, the bonding that occurs between the silane coupling agent and the inorganic surface of the vitreous material is via the formation of hydrogen bonds between the hydroxyl groups of the inorganic material and the hydrophilic, preferably hydroxyl, groups of the silane which are formed by hydrolysis of the silane functional groups once it is exposed to water. An example of this reaction is set forth below:

Silane

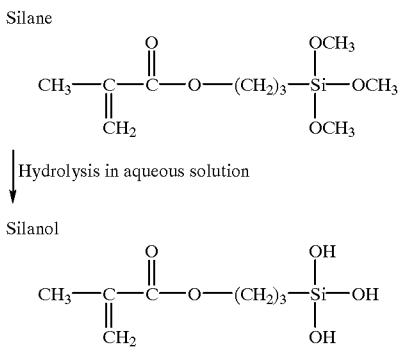

Hydrolysis in aqueous solution

Silanol

Thus, it should be understood that when the silane in an aqueous solution it may be present in the "silanol" form. Suitable silanes include those having the general formula:

Y—(CH$_2$)$_{\overline{n}}$—SiX$_3$,     I.

wherein n = 0–3,

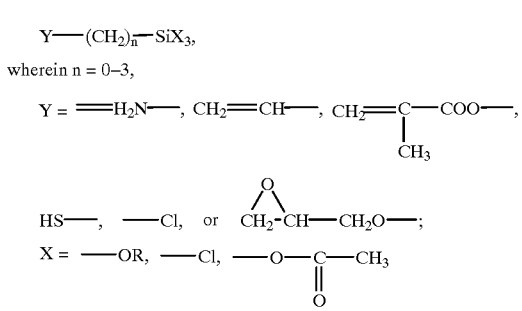

R=C$_{1-20}$ straight or branched chain alkyl, preferably methyl or ethyl.

Also suitable are silanes having the general formula:

$$Y-(CH_2)_{\overline{n}}-SiX_{3-a} \atop (CH_3)_a \qquad \text{II.}$$

wherein n = 0–3
a = 0–2
Y = —NH$_2$, CH$_2$=CH—, CH$_2$=C(CH$_3$)—COO—,
CH$_2$=CH—COO—, CH$_3$—NH—,
NH$_2$—CO—NH—, HS—, —Cl, NH$_2$(CH$_2$)$_2$NH—,

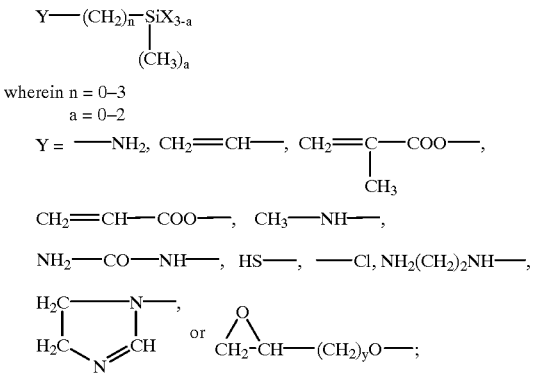

X is each independently —CH$_3$, —Cl, —OCOR', —OC$_2$H$_4$OCH$_3$, —(OC$_2$H$_4$)$_2$OCH$_3$, or —OR, where R is a C$_{1-20}$ straight or branched chain alkyl, and R' is a C$_{13}$ alkyl or alkenyl, wherein R and R' are preferably methyl or ethyl, and y is 1–3.

Examples of silanes having the above formulas are those sold by Hüls America (now SIVENTO Inc.) under the Dynasylan and Hydrosil tradenamnes, namely AMMO, 1110, AMEO-P, AMEO-T, 1151, 1211, 1302, 1505, 1506, DAMO, DAMO-T, 1411,TRIAMO, 2201,IMEO, MEMO-E, GLYMO, MTMO, 3201, 3403, CPTMO, VTC, VTMO, VTEO, VTMOEO, SILFIN, HS 2629, HS2759, HS 2781, HS 2775, and HS 2776, and the like.

Other organofunctional silanes such as those disclosed in U.S. Pat. No. 5,221,560, which is hereby incorporated by reference, are also suitable. Such organosilanes are acryloxyfunctional silanes including 3-methacryloxypropyltrimethoxysilane, 3-acryloxypropyltrimethoxysilane, 2-methacryloxyethyltrimethyoxysilane, 2-acryloxyethyltrimethyoxysilane, 3-methacryloxypropyltriethoxysilane, 3-acryloxypropyltriethoxysilane, 2-methacryloxyethyltriethoxysilane, 2-acryloxyethyltriethoxysilane, etc.

Particularly preferred are GLYMO and MEMO-E. GLYMO is 3-glycidoxypropyltrimethoxysilane and MEMO is 3-trimethoxysilylpropyl methacrylate.

(c) Other Ingredients

The primer composition may also contain various other additives such as surfactants, leveling agents, viscosity modifiers, and the like.

Preferably, the primer composition contains 0.001–20%, preferably 0.01–15%, more preferably 0.05–10% of a surfactant which may be cationic, anionic, amphoteric, zwitterionic, or nonionic. Suitable amphoteric surfactants are generally derivatives of aliphatic secondary or tertiary amines wherein one aliphatic radical is a straight or branched chain alkyl of 8 to 18 carbon atoms and the other aliphatic radical contains an anionic group such as carboxy, sulfonate, sulfate, phosphate, or phosphonate. Suitable zwitterionic surfactants include betaines, as well as those of the general formula:

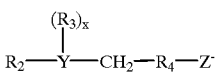

wherein R$_2$ contains an alkyl, alkenyl or hydroxy alkyl radical of from about 8 to about 18 carbon atoms, from 0 to about 10 ethylene oxide moieties and 0 or 1 glyceryl moiety; Y is selected from the group consisting of nitrogen, phosphorus, and sulfur atoms; R$_3$ is an alkyl or monohydroxyalkyl group containing about 1 to 3 carbon atoms; x is 1 when Y is a sulfur atom, and 2 when Y is a nitrogen or phosphorus atom; R$_4$ is an alkylene or hydroxyalkylene of from about 1 to about 4 carbon atoms, and Z is a radical selected from the group consisting of carboxylate, sulfonate, sulfate, phosphonate, and phosphate groups. Suitable anionic surfactants include alkyl ether sulfates and sulfonates, as well as succinates, succinimate, and olefin sulfonates.

Preferably, the surfactant is a nonionic surfactant. Nonionic surfactants are generally compounds produced by the condensation of alkylene oxide groups with a hydrophobic compound. Classes of nonionic surfactants are:

(a) Long chain dialkyl sulfoxides containing one short chain alkyl or hydroxy alkyl radical of from about 1 to 3 carbon atoms and one long hydrophobic chain which may be an alkyl, alkenyl, hydroxyalkyl, or ketoalkyl radical containing from about 8 to 20 carbon atoms, from 0 to 10 ethylene oxide moieties, and 0 or 1 glyceryl moiety.

(b) Polysorbates, such as sucrose esters of fatty acids. Examples of such materials include sucrose cocoate, sucrose behenate, and so on.

(c) Polyethylene oxide condensates of alkyl phenols, for example the condensation products of alkyl phenols having an alkyl group of 6 to 20 carbon atoms with ethylene oxide being present in amounts of about 10 to 60 moles of ethylene oxide per mole of alkyl phenol.

(d) Condensation products of ethylene oxide with the reaction product of propylene oxide and ethylene diamine.

(e) Condensation products of aliphatic alcohols having 8 to 18 carbon atoms with ethylene oxide, for example a coconut alcohol/ethylene oxide condensate having 10 to 30 moles of ethylene oxide per mole of coconut alcohol, the coconut alcohol fraction having 10 to 14 carbon atoms.

(f) Long chain tertiary amine oxides such as those corresponding to the general formula:

R$_1$R$_2$R$_3$NO wherein R$_1$ contains an alkyl, alkenyl or monohydroxyalkyl radical ranging from about 8 to 18 carbon atoms in length, from 0 to about 10 ethylene oxide moieties, and from 0 to about 1 glyceryl moiety and R$_2$ and R$_3$ are each alkyl or monohydroxyalkyl groups containing from about 1 to about 3 carbon atoms.

(g) Long chain tertiary phosphine oxides corresponding to the general formula:

RR$_1$ R$_2$PO wherein R contains an alkyl, alkenyl, or monohydroxyalkyl radical having 8 to 18 carbon atoms, from 0–10 ethylene oxide moieties and 0 or 1 glyceryl moiety, and R$_2$ and R$_3$ are each alkyl or monohydroxyalkyl group containing from about 1 to 3 carbon atoms.

(h) Alkyl polysaccharides having a hydrophobic group of 6 to 30, preferably 10, carbon atoms and a polysaccharide group such as glucose, galactose, etc. Suitable alkyl polysaccharides are octyl, nonydecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses, and so on.

(i) Polyethylene glycol (PEG) glyceryl fatty esters, which are the reaction product of polyethylene glycol, glycerin, and fatty acids. Suitable PEG glyceryl fatty esters may be monoesters, diesters, or triesters. Such compounds are manufactured by Goldschmidt Corporation under the TAGAT tradename. Suitable monoesters include, for example, those having the general formula:

RC(O)OCH$_2$CH(OH)CH$_2$(OCH$_2$CH$_2$)$_n$OH wherein n is 2–200 and RC(O)— is a hydrocarbylcarbonyl group wherein R is an aliphatic radical having 7 to 30, preferably 8–20 carbon atoms.

(j) Other nonionic surfactants that may be used include $C_{10-18}$ alkyl($C_{1-6}$)polyhydroxy fatty acid amides such as $C_{12-18}$ methylglucamides, N-alkoxy polyhydroxy fatty acid amides, N-propyl through N-hexyl $C_{12-18}$ glucamides and so on.

Other suitable nonionic surfactants include fluorinated nonionic surfactants. The term "fluorinated nonionic surfactant" means a fluorine containing compound having at least one liphophilic group or portion and at least one hydrophilic group or portion. Examples of such surfactants are set forth in U.S. Pat. No. 4,961,976 which is hereby incorporated by reference. Also suitable are fluorocarbon surfactants, such as those marketed under the Fluorad trademark by 3M Company. These fluorochemical surfactants include fluorinated alkyl esters, fluorinated alkyl polyoxyethylene ethanols, and the like. Fluorinated alkyl alkoxylates are marketed by 3M under the trademark FC-171.

The preferred nonionic surfactants for use in the present invention are polyethylene glycol glyceryl fatty esters of the formula

RC(O)OCH$_2$CH(OH)CH$_2$(OCH$_2$CH$_2$)$_n$OH wherein n is 2–200 and RC(O)— is a hydrocarbylcarbonyl group wherein R is an aliphatic radical having 8–20 carbon atoms. Particularly preferred is a polyethylene glycol glyceryl fatty acid monoester sold by Goldschmidt Corporation under the tradename Tagat S5, which is PEG-5 glyceryl-monostearate. In the preferred embodiment of the invention Tegoglas T5 is used which is an aqueous solution of Tagat S5, sold by Goldschmidt Corporation.

The preferred primer compositions in accordance with the invention comprises:

(a) 90–99.99% water, (b) 0.1–10% of a silane coupling agent having the general formula:

II.

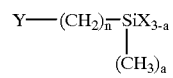

Y—(CH$_2$)$_{\overline{n}}$SiX$_{3-a}$
         |
       (CH$_3$)$_a$ wherein n = 0–3
a = 0–2

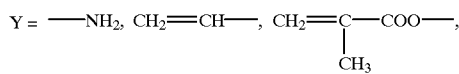

Y = —NH$_2$, CH$_2$=CH—, CH$_2$=C—COO—,
                                    |
                                   CH$_3$

-continued

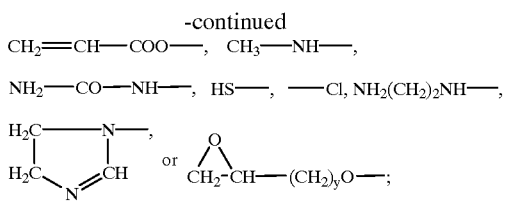

CH$_2$=CH—COO—, CH$_3$—NH—,

NH$_2$—CO—NH—, HS—, —Cl, NH$_2$(CH$_2$)$_2$NH—,

H$_2$C—N—
|       \
H$_2$C    CH    or    CH$_2$-CH—(CH$_2$)$_y$O—;
   \   //              \ /
    N                    O

X is each independently —CH$_3$, —Cl, —OCOR', —OC$_2$H$_4$OCH$_3$, —(OC$_2$H$_4$)$_2$OCH$_3$, or —OR, where R is a C$_{1-20}$ straight or branched chain alkyl, and R' is a C$_{1-3}$ alkyl or alkenyl, wherein R and R' are preferably methyl or ethyl, and y is 1–3; and (c) 0.001–10% of a nonionic surfactant which is a polyethylene glycol glyceryl fatty ester, having the general formula

RC(O)OCH$_2$CH(OH)CH$_2$(OCH$_2$CH$_2$)$_n$OH wherein n is 5–200 and RC(O)— is a hydrocarbylcarbonyl group wherein R is preferably an aliphatic chain having 8–20 carbon atoms.

More preferably, the primer agent composition comprises:

(a) 90–99.99% water, (b) 0.1–10% of a silane selected from the group consisting of 3-glycidoxypropyltrimethoxysilane, 3-trimethoxysilylpropyl methacrylate, and mixtures thereof; and (c) 0.001–10% of a nonionic surfactant which is a polyethylene glycol glyceryl fatty acid monoester, where the fatty acid is stearic acid.

Preferably, the primer composition has a pH of less than 7, preferably a pH of 1–6, more preferably a pH of 3.5 to 4.5 with a range of 3.8 to 4.3 being most suitable. The pH of the composition can be adjusted with acids or bases which are usually used for this purpose, i.e. amines, acetic acid, and so on.

2. The Radiation Curable Ink Compositions

The pre-treatment method of the invention may be used with a wide variety of radiation curable ink compositions provided that such compositions contain a monomer, oligomer, or low molecular weight polymer (to include terpolymers, block and graft copolymers) that is radiation curable.

(a) Monomers, Oligomers, and Polymers

Suggested ranges of the monomer, oligomer, or polymer in the radiation curable composition are 0.1–99%, preferably 0.5–95%, more preferably 1–90% by weight of the total composition.

The bis-phenol-A epoxy resins as described in U.S. Pat. No. 5,656,336, which is hereby incorporated by reference, are suitable. Such ink compositions comprise: bis phenol-A epoxy resin having the formula:

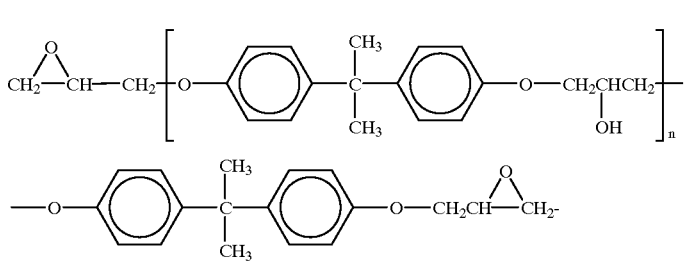

wherein n = 0–20,

Also suitable for use as the ink are compositions containing acid functional monomers or oligomers, such as those disclosed in U.S. patent application Ser. No. 868,409, filed Jun. 3, 1997, entitled Method and Compositions For Decorating Glass, by inventors Melvin Kamen and Ming Hu, which is hereby incorporated by reference. These ink compositions preferably contain about 5–95%, more preferably about 10–85%, most preferably about 15–75% of a monomer, oligomer, or low molecular weight homo- or copolymer having at least one free acid group. A variety of such materials are suitable, provided they have at least one free acid group, such as a carboxylic acid, sulfonic acid, or phosphoric acid group. The phrase "having at least one free acid group" means that the monomer, if used, has at least one free acid group, or the oligomer, if used, contains at least one monomer unit containing a free acid group, or if a homo- or copolymer is used, at least one monomer unit thereof contains at least one free acid group. Preferably the ink composition contains a monomer or oligomer, in particular an ethylenically unsaturated monomer or oligomer having at least one free acid group. Examples of preferred monomers or oligomers include those having carboxylic acid functional groups, e.g. either the monomer:

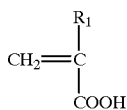

wherein $R_1$ is H, a $C_{1-30}$ straight or branched chain, substituted or unsubstituted, saturated or unsaturated alkyl, aryl, aralkyl, a pyrrolidone, or a substituted or unsubstituted aromatic, alicyclic, or bicyclic ring where the substitutents are $C_{1-30}$ straight or branched chain alkyl, or halogen, or the monomer:

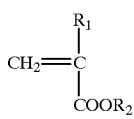

wherein $R_1$ is as defined above, and $R_2$ is X—COOH wherein X is a $C_{1-30}$ straight or branched chain alkyl, aryl, arylalkyl, or —$(CH_2CH_2-O)_n$—Y—COOH or —$(CH_2CH_2CH_2-O)_n$—Y—COOH wherein Y is a $C_{1-10}$ straight or branched chain alkyl and n is 1–10,000, or an oligomer formed from one of those monomers, as well as mixtures of the foregoing.

Preferably the monomer is of Formula II wherein $R_1$ is H or $CH_3$, and $R_2$ is X—COOH wherein X is a $C_{1-10}$ straight or branched chain alkyl, more preferably ethyl. More preferably $R_2$ is β-carboxyethyl, e.g. as in β-carboxyethyl acrylate, which is sold in the form of a mixture with acrylic acid and oligomers of acrylic acid, under the tradename β-CEA by UCB Radcure, Inc. β-CEA contains both ethylenic unsaturation and carboxylic acid functionality. Much of the carboxylic acid functionality comes from acrylic acid dimer. β-CEA is a mixture of about 40% by weight β-carboxyethylacrylate, about 40% by weight of oligomers of acrylic acid, and about 20% by weight of monomeric acrylic acid. The β-carboxyethylacrylate component of this mixture has the following formula:

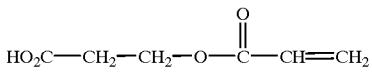

In addition, carboxylic acid functional oligomers, such as aromatic acid methacrylate half esters and aromatic acid acrylate half esters, are also suitable acid functional oligomers for use in the method of the invention. Examples of such oligomers are partial esters of low molecular weight copolymers of ethylenically unsaturated dicarboxylic acid anhydrides such as those disclosed in U.S. Pat. No. 4,722,947, which is hereby incorporated by reference. These partially esterified copolymers correspond to the following formula:

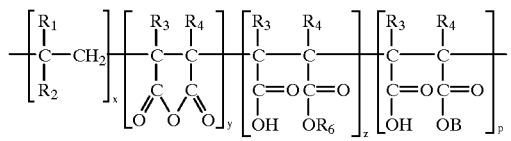

wherein $R_1$ and $R_2$ are each independently hydrogen, $C_{1-20}$ alkyl, aryl, alkaryl, cycloalkyl, or halogen; $R_3$, $R_4$, and $R_5$ (see below) are each independently hydrogen, $C_{1-20}$ alkyl, or aryl; and $R_6$ is the same or different and is alkyl, aralkyl, or an alkyl substituted aralkyl radical containing about 1 to 20 carbon atoms as well as oxyalkylated derivatives thereof; and the subscripts x, y, z, and p are each whole numbers such that the sum of x, y, z, and p may range from about 3 to 20; and x, p, and y are each equal to or greater than 1, and z may be 0; and B is $OAOCOCR_5CH_2$ wherein A is a linear or branched divalent alkylene of from about 1 to 20 carbon atoms, or an oxyalkylated derivative thereof as described for $R_6$.

Particularly preferred aromatic partial esters of anhydride containing copolymers are those sold by Sartomer, Inc. under the Sarbox tradename, such as Sarbox SB-400, SB-500, and SB-600. Particularly preferred is aromatic acid methacrylate half ester in ethoxylated trimethylolpropane triacrylate, which is sold by Sartomer, Inc. under the tradename Sarbox SB500E50.

Other suitable carboxylic acid functional monomers include acrylic acid, bisacrylamidoacetic acid, 4,4-bis(4-hydroxphenyl)pentanoic acid, 3-butene-1,2,3-tricarboxylic acid, 2-carboxyethyl acrylate, itaconic acid, methacrylic acid, 4-vinylbenzoic acid, and mixtures of these materials.

Examples of monomers containing sulfonic acid groups include 2-acrylamido-2-methyl-1-propanesulfonic acid; 2-methyl-2-propene-1-sulfonic acid, 2-propene-1-sulfonic acid, 4-styrenesulfonic acid, 2-sulfoethyl methacrylate, 3-sulfopropyldimethyl-3-methacrylamidopropyl ammonium inner salt, 3-sulfopropyl methacrylate, vinysulfonic acid, and so on.

Examples of monomers containing phosphoric acid functional groups include bis(2-methacryloxyethyl)phosphate, monoacryloxyethyl phosphate, and so on.

Also suitable for use as the ink compositions such as disclosed in U.S. Pat. No. 5,487,927, which is hereby incorporated by reference. These radiation curable compositions contain a cationically curable cycloaliphatic epoxide, preferably one having at least two epoxy groups per molecule. Polymeric cycloaliphatic epoxides are suitable also, such as those formed by the reaction products of epichlorohydrin and phenol or a phenolformaldehyde resin, diepoxy resin, epoxidized oils, and epoxidized polyolefins. Such epoxides include novolac epoxides, glycidyl ethers of various types including diglycidyl ethers of bisphenol, diglycidyl ethers of butanediol, and the like. Also suitable are homopolymers or copolymers that contain pendant epoxide groups such as those made from glycidyl methacrylate or acrylate with or without other ethylenically unsaturated monomers. Examples of such cycloaliphatic epoxides are 3,4-epoxycyclohexylmethyl-3,4-epoxycyclohexane carboxylate, bis-(3,4-epoxy-cyclohexylmethyl)adipate, vinylcyclohexene diepoxide, bis(2,3-epoxycyclophenyl) ether, epoxidized butadiene, 2,3-epoxy-2-methylcyclohexylmethyl-3,4-epoxy-2-methylcyclohexane carboxylate, or mixtures thereof. These cycloaliphatic epoxides are sold by Union Carbide Chemicals and Plastics Company under the tradename Cyracure.

Other radiation curable inks are as set forth in U.S. Pat. Nos. 5,571,359 and 5,562,951, both of which are hereby incorporated by reference. These compositions comprise monomers, oligomers, or other low molecular weight polymers made from monomer units such as epoxide, cycloaliphatic epoxide, vinyl chloride, styrene, ethyl acrylate, vinyl acetate, difunctional acrylic (monomers such as hydroxy alkyl acrylates or hydroxy alkyl methacrylates, vinyl butyrate, vinyl methyl ether, methyl methacrylate, isobornyl acrylate, acrylonitrile and mixtures thereof The radiation curable ink compositions may also contain other ingredients such as pigments, photointiators, photosensitizers, coupling agents, surfactants and the like.

(b) Pigments

The radiation curable ink compositions used in the method of the invention may be clear or pigmented. If pigmented, ranges of 0.01–50%, preferably 0.05–40%, more preferably 0.1–35% by weight of the total composition, of pigment is suggested. Suitable pigments include organic and inorganic pigments. Examples of such pigments are set forth in U.S. Pat. No. 5,178,952, which is hereby incorporated by reference. Inorganic pigments include extender pigments such are baryites, barium sulfate, calcium carbonate, talc, clay, alumina, titanium dioxide, white carbon, chinese white, zinc sulfide, lithopone, ultramarine, Prussian blue, cobalt, chrome oxide, viridian chrome green yellows, oranges, and reds, cadmium, chromium, iron oxides, carbon black, metallic pigments, aluminum powder, bronze powder, zinc chromate, strontium chromate, zinc dust, copper, and so on. Examples of suitable organic pigments include azo pigments, indolinones, isoindolinones, vat pigments, the Lakes, pthalocyanine pigments and so on. The preferred pigment to impart white color to the ink composition is titanium dioxide. Preferred red and yellow pigments are isoindolinones and pyrrolopyrrols as disclosed in U.S. Pat. Nos. 4,415,685; 4,579,949; 4,791,204; 4,666,455; 5,074,918; 4,783,540; 4,914,211; 4,585,878; as well as U.S. Pat. No. 5,571,359, of Kamen, et. al., which is hereby incorporated by reference. These pyrrolopyrrols are generally of the formula:

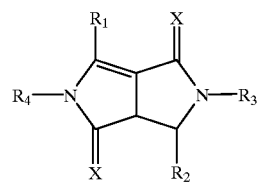

wherein $R_1$ and $R_2$ are each independently alkyl arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl, phenyl, benzoyl, benzyl, arylalkyl, aryl, alkanoyl, $C_{5-6}$ cycloalkyl, alkenyl, alkynyl, carbamoyl, alkylcarbamoyl, arylcarbamoyl, or alkoxycarbonyl; and X is O or S. Preferred is a compound wherein $R_1$ and $R_2$ are each independently phenyl or naphthyl, $R_3$ and $R_4$ are hydrogen, and X is O. Particularly preferred is pyrrolo 3,4-C pyrrol-1,4-dione, 2,5-dihydro-3,6-di-4-chlorophenyl which has a CAS number 84632-65-5 and is known by the common name C.I. pigment red 254. This pigment is commercially available from Ciba-Geigy Pigments Division, Newport, Del., under the tradename Irgazin DPP Red 80. Other Ciba-Geigy red pigments sold under the tradename Irgazin are also suitable.

Suitable isoindolinones are as set forth in U.S. Pat. Nos. 3,884,955, 3,867,404, 4,978,768, 4,400,507, 3,897,439 and 4,262,120 and 5,194,088 all of which are hereby incorporated by reference. Preferred isoindolinones are tetrachloro-cyanobenzoic acid alkyl esters, particularly benzoic acid, 2,3,4,5-tetrachloro-6-cyano-methyl ester which is reacted with 2-methyl-1,3-benzenediamine and sodium methoxide. This pigment composition has the common name C.I. Pigment Yellow 109 and is available commercially from Ciba-Geigy Pigments Division, Newport, Del. under the tradename Irgazin yellow 2GLTE. Other pigments in the Irgazin Yellow series as manufactured by Ciba-Geigy are also suitable.

(c) Photosensitizers

With certain ink colors it may also be desired to include in the ink composition a photosensitizer, which is generally defined as a molecule which absorbs radiant energy which it then passes on to the photoinitiator. The photosensitizer then returns to its energetic ground state while the photoinitiator is activated and undergoes chemical changes as if it had itself absorbed the energy. As the photosensitizer often absorbs energy in a different part of the spectrum then does the photointiatior, thus a more effective use of the light source can be achieved. If a photosensitizer is used, generally a 1:10 to 1:200, more preferably 1:50 to 1:100 ratio of photosensitizer to photoinitiator respectively, is suggested. Typical examples of photosensitizers which assist in cationic curing are thioxanthone compounds, in particular isopropyl thioxanthone which is marketed under the Escacure ITX trademark by Sartomer. Suggested ranges of photosensitizers are 0.01–20%, preferably 0.05–15%, more preferably 0.1–10% by weight of the total ink composition.

(d) Photoinitiators

The compositions of the invention comprise 0.1–25%, preferably 0.5–20%, more preferably 1–15% by weight of the total composition of a photoinitiator which catalyzes the polymerization of the monomers upon exposure to the radiation by which the monomers are curable. There are generally two types of photoinitiators: free radical and cationic. Free radical initiators are more commonly used with ethylenically unsaturated monomers and oligomers, while cationic photoinitiators are used with epoxy or vinyl ether functional resins. Suitable free radical-type photoinitiators include carbonyl compounds such as ketones, acetophenones, benzophenones, and derivatives thereof. Examples of such materials include, for example, methyl ethyl ketone; benzophenone; benzyl dimethyl ketal; 1-hydroxycyclohexylphenylketone; diethyoxyacetophenone; 2-methyl-1-(methylethiophenyl)-2-(4-morpholinyl)-1-propanone; 2-benzyl-2-N,N-dimethylamino-1,4(4-morpholinophenyl)-1-butanone; 2,2-dimethoxy-2-phenyl acetophenone; 2-methyl-1-[4-(methylthio)phenyl]-2-morpholino propan-1-one; 2-hydroxy-2-methyl-1-phenyl-propan-1-one; 4-(2-hydroxyethoxy)phenyl-(2-hydroxy-2-methylpropyl)ketone; and a mixture of bis(2,6-dimethyoxybenzoyl)-2-4-4-trimethylpentyl phosphine oxide and 2-hydroxy-2-methyl-1-phenyl-propan-1-one.

If the monomers in the ink compositions used in the method of the invention cure by cationic mechanisms, it is desirable to add a cationic photoinitiator which catalyzes cross-linking of the resin upon exposure to the radiation to which the resin is sensitive. Various types of cationic photoinitiators are suitable. Both ionic cationic photoinitiators such as onium salts or organometallic salts are suitable as well as non-ionic cationic photoinitiators such as organosilanes, latent sulphonic acids and the like. Preferred are photosensitive onium salts, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974. Also suitable are ferrocenium salts such as those sold under the Irgacure tradename by Ciba-Geigy, in particular Irgacure 261. Sulphonyloxy ketones and silyl benzyl ethers are also good cationic photoinitiators. A detailed analysis of the mechanism of cationic curing is disclosed in "Photosensitized Epoxides as a Basis or Light-Curable Coatings" by William R. Watt, American Chemical Society Symposium, Ser. 114, Epoxy Resin Chemistry, Chapter 2, 1979, and in "Chemistry and Technology of UV and EB Formulation for Coatings, Inks, and Paints," Volume 3, entitled "Photoinitiators for Free Radical and Cationic Polymerization, K. K. Dietliker, pages 332–374 (1991), both of which are hereby incorporated by reference. Photosensitive onium salts are used as photoinitators in cationic curing, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974.

(e) Defoaming Agents

Suitable defoaming agents will cause the ink to apply smoothly on the glass substrate without bubbles or unevenness. If defoaming agents are used, ranges of 0.01–20%, preferably 0.05–15%, more preferably 0.1–10% by weight of the total composition is suggested. A wide variety of defoamers are suitable, for example, those sold by BYK Chemie under the BYK tradename or by Tego Chemie Services, USA under the FOAMEX tradename. Particularly suitable is FOAMEX N, a silicone based defoaming agent, which comprises dimethylpolysiloxane dispersed in silicic acid. Also preferred is BYK-033 which is a mixture of about 5% by weight ethoxylated alkylphenol, and 92% by weight of heavy petroleum distillates (or paraffin). Other defoaming agents are also suitable, for example, polyvinyl ethers such as BYK-052 and BYK-053. BYK-052 is polyvinylbutyl ether in Stoddard solvent. BYK-354, a polyacrylate solution, and BYK-022, a mixture of hydrophobic solids and foam destroying polysiloxanes in polyglycol, may also be used.

(f) Other Ingredients

Suitable photoinitators, coupling agents, and surfactants may be added to the ink compositions. Examples of such materials and ranges for addition are as mentioned above. In the preferred embodiment of the invention both the primer composition and the radiation curable ink composition contain a coupling agent so that the coupling agent is, in essence, applied to the vitreous article twice.

THE METHOD OF THE INVENTION

In the method of the invention, the primer composition is applied to the vitreous article, which is preferably glass. The composition may be applied in a variety of ways, such as by spraying, dipping, roller coating, painting, screening, and the like. Preferably, the primer composition is applied to the article by spraying, either manually or online in a factory setup where an appropriate container integrated into the line will spray the composition on the glass container before it passes on to the printing workstation. In most factory setups the line setup will be such that the glass article will emerge from the molding oven and pass through the spraying station prior to entering the printing workstation. The article may be sprayed with the primer composition while the article is still warm, or the article can be sprayed while it is at room temperature. Preferably, the primer composition is applied to the article while it is an elevated temperatures, for example from 100 to 400° F., just after it emerges from the molding oven. After the primer composition is applied to the article it may enter the printing workstation immediately, or it may be printed at some later time. In another preferred embodiment, the article is sprayed while at room temperature, and then heated to an elevated temperature of about 150 to 200, preferably 160–170° F. In the alternative, the article is sprayed while at room temperature, then the composition is dried with an air gun or dryer at room temperature. The article then enters the printing station. Alternatively, the article may be heated first to an elevated temperature, then sprayed, before entering the printing station. The solvent portion of the sprayed composition rapidly evaporates leaving the coupling agent and other ingredients on the surface of the article. It has been found that if the article is heated to an elevated temperature after it is sprayed, the coupling agent more readily reacts with the glass surface to form a chemical bond.

After the primer composition is sprayed onto the article and the solvent has substantially evaporated, it is decorated with the radiation curable composition. Obviously, the primer composition is applied to the article in the area where the radiation curable indicia is applied.

The ink composition is applied to the article to be decorated in a predetermined design using a variety of printing methods including screen printing, offset printing, gravure, hand painting, curtain or roller coating, and the like. After the ink is applied the substrate or article is irradiated with UV or actinic radiation using a conventional light source. The term "UV" means ultraviolet light which generally has a wavelength of 190 to 500, preferably 200 to 450 nanometers. The term "actinic" means radiation having a wavelength of 200 to 600 nanometers. Electron beam may be used instead of a UV light source. If a UV conveyer is used, it is set up so that the substrate passes through the beam of radiation for an amount of time appropriate to completely cure the ink composition and cause it to adhere to the substrate. If desired, the substrate may be moved through the conveyer in one or more passes to achieve the required curing. The appropriate time varies depending on the ink formula, but generally curing is complete in a period of time ranging from fractions of a second to several minutes. It is preferred, that by the time the decorated substrate or article is removed from the conveyer, the ink is completely cured and fused to the substrate surface, providing a bright true color. While the newly screened glass container may be exposed to slightly elevated temperature prior to UV curing the applied ink on the substrate, or to an additional post-UV cure application of heat to finally polymerize the ink on the substrate, this is not really necessary. This ink is well suited for use in automated systems such as the multiple color printing apparatus disclosed in copending application Ser. No. 432,485, filed May 1, 1995 by Kamen, et al., entitled "Apparatus and Method For Screen Printing Radiation Curable Compostions", or with the methods disclosed in U.S. Pat. No. 5,562,951, by Kamen et al., entitled "Method For Printing Articles With Multiple Radiation Curable Compositions", both of which are hereby incorporated by reference in their entirety.

In the method of the invention, multiple colors may be applied to the glass substrate by spraying the article, then applying and curing one color, and repeating the process until as many successive colors as desired have been applied to the glass in complete or partial registration.

In another embodiment of the invention, it is possible to apply an unpigmented ink composition on the glass substrate in predetermined design after spraying the substrate with the primer composition. For example, a substrate such as a container may be decorated in a predetermined design by first spraying the article with the primer composition, then silk screening the unpigmented ink composition on the substrate and curing with the appropriate radiation. A layer of hot stamping foil is then compressed against the substrate with a press which is heated to a temperature sufficient to cause the hot stamping foil to adhere to the printed ink design but not to the ink-free areas of the glass. Hot stamping foil is generally a laminate comprised of a carrier material (often polyester or a similar material capable of release), a release film between the carrier and a subsequent decorative coat which is usually color or a metallized coat, most often aluminum or colored aluminum. The foil may contain other optional layers such as one or more protective layers, hot melt adhesive layers, etc. between the metallized layer or layers and the carrier material. More specifically, hot stamping foil can be defined as a multilayer web comprised of a backing film carrier, a release coating, one or more protective top coatings, one or more color coatings, and a hot melt adhesive in that order. The hot stamping foil is then compressed against the container with the hot melt adhesive layer being compressed against the substrate. The compress, which may be a standard hot stamping press or a hand held press, is heated to a temperature sufficient to cause the hot melt adhesive layer of the hot stamping foil to adhere to the ink decorated portion of the substrate. Generally this temperature ranges from about 250 to 400° F. Temperatures higher than this may cause deterioration of the hot stamping foil. The application of heat causes the adhesive side of the hot stamping foil to become adhesively adhered to the ink design but not to the ink-free areas of the substrate. When the compress is removed, a portion of the foil laminate adheres to the ink decoration but not to the ink free areas of the glass. In particular, adhered to the ink design on the substrate is the hot melt adhesive layer, the color coatings, and the protective top coatings, in that order, of the hot stamping foil. Portions of the release coating may or may not be adhered to the protective top coating because the release coating is designed to melt upon application of heat and cause the polyester carrier backing layer to release from the protective top coat layer and some remnants may remain.

The resulting hot stamped substrate exhibits a metallic gold, silver, or colored appearance depending on the color of the hot stamping foil.

The compositions and method of the invention appreciably improve adherence of radiation cured decorative indicia to vitreous articles.

The invention will be further described in connection with the following examples which are set forth for the purpose of illustration only.

EXAMPLE 1

A primer composition in accordance with the invention was made according to the following formula:

|  | w/w % |
|---|---|
| MEMO-E* | 0.5 |
| Tegoglas T5** | 0.5 |
| Water | 99.0 |

*A silane sold by Hüls America, Somerset, New Jersey, which has the formula $CH_2=C(CH_3)-COO-(CH_2)_3-Si(OCH_3)_3$
**an aqueous solution of PEG-5 glyerylmonostearate, Goldschmidt Corporation, McDonald, PA.

The water was poured into a separate container, and a few drops of acetic acid added to adjust the pH of the water to a range of 3.5 to 4.5, preferably 3.8 to 4.0. The Tegoglas T5 was added with gentle stirring until completely dissolved and the solution was clear. The MEMO was added with stirring until dissolved and the solution was clear. The pH of the composition was 3.8. The composition was poured into a container equipped with a spray nozzle.

EXAMPLE 2

A red ink composition having the following formula was prepared as follows:

|  | w/w % |
|---|---|
| SB500 E50[1] | 15.0 |
| Photomer 6173[2] | 35.0 |
| CN 104[3] | 15.0 |
| SR 2564[4] | 2.0 |
| SR 502[5] | 13.0 |
| Irgazin DDP Red BO[6] | 12.0 |
| I-907[7] | 3.0 |
| I-1800[8] | 3.0 |

-continued

|  | w/w % |
| --- | --- |
| Foamex N[9] | 1.0 |
| MEMO[10] | 0.8 |
| A-1310[11] | 0.8 |

[1]Aromatic acid methacrylate half ester in ethoxylated trimethylolpropane triacrylate (50:50, w/w), Sartomer Company, Inc., Exton, PA.
[2]UV/EB curable acrylate oligomer, Henkel Corp. Kankakee, IL
[3]Epoxy acrylate + tripropylene glycol acrylate
[4]2(2-ethoxyethoxy)ethylacrylate, Sartomer Company, Exton, PA.
[5]Ethoxylated trimethylolpropane triacrylate, Sartomer Company
[6]Pigment red 254, (diketopyrrolopyrrole), Ciba Geigy Corp., Hawthorne, New York
[7]2-methyl-1-[4-methylthio)phenyl]-(4-morpholine)-1-propanone, Ciba Geigy Corp
[8]A mixture of 25% by weight bis(2,6-dimethyoxybenzoyl)(2,4,4-trimethylpentyl)phosphine oxide and 75% by weight 1-hydroxycyclohexylphenyl ketone, Ciba Geigy
[9]Polydimethylsiloxane dispersed in silicic acid, Goldschmidt Corporation, Hopewell, VA.
[10]3-methacryloxypropyltrimethoxysilane, Huls America.
[11]Gamma isocyanotopropyltriethoxysilane, Osi Specialties, Inc., Danbury, CT.

EXAMPLE 3

The composition of Example 1 was sprayed on brown glass alcoholic beverage bottles heated to a temperature of 160 to 170° F. After the bottles cooled to room temperature, at which point they were substantially dry, the composition of Example 2 was applied to the glass bottles by silk screening indicia onto the glass through a 255 mesh screen. The ink was cured on the glass by exposure to a 9 mm. ultraviolet D bulb having a power of 600 watts per inch, manufactured by Fusion Inc., for about half a second. The decorated bottles were allowed to cool.

Adhesion was tested on several of the cooled bottles by immersion in water heated to a temperature of 70° C. (158° F.) for 1 hour. The ink remained adherent to the glass, although in some areas the ink was thin and spotty.

The remaining bottles were divided into three groups and subjected to a post-cure heat treatment as follows:

(a) 250° F. (121.1° C.) for 2 minutes (b) 290° F. (143.3° C.) for 1 minute (c) 300° F. (148.9° C.) for 1 minute Bottles (a), (b), and (c) were immersed in water heated to 70° C. for one hour. Adhesion of the ink to (a), (b), and (c) was excellent. The ink appeared to be untouched. No evidence of peeling or chipping was present.

Bottles (a), (b), and (c) were then immersed in a solutions of concentrated NaOH heated to a temperatures of 150° and 160° F. to evaluate resistance of ink to removal by hot caustic. A number of (a) bottles were immersed in 4.5% NaOH heated to a temperature of about 150° F. The ink composition on one of the (a) bottles washed off after 4 minutes. Three more of the (a) bottles were immersed in 4.5% NaOH heated to a temperature of 160° F. The ink was removed on the bottles after 2 minutes, 53 seconds; 2 minutes 45 seconds; and 2 minutes 40 seconds; respectively.

EXAMPLE 4

The composition of Example 1 was sprayed onto glass containers having a temperature of 170° F. After the bottles cooled to room temperature, the composition of Example 2 was applied to the glass bottles by silk screening indicia onto the glass through a 255 mesh screen. The ink was cured on the glass by exposure to a 9 mm. ultraviolet D bulb having a power of 600 watts per inch, manufactured by Fusion Inc., for about half a second. The bottles were divided into four groups and heat treated as follows:

| Group | Temperature (F.) | Time |
| --- | --- | --- |
| 1 | 165 | 2 min. |
| 2 | 180 | 1 min. 15 sec. |
| 3 | 200 | 2 min. |
| 4 | 220 | 1 min. 30 sec. |

The following results were obtained after immersing the treated bottles in water having a temperature of 70° C. for one hour:

| Group | Temperature F. | Adhesion |
| --- | --- | --- |
| 1 | 165 | good |
| 2 | 180 | small parts not good, majority excellent |
| 3 | 200 | small parts not good, majority excellent |
| 4 | 220 | excellent |

EXAMPLE 5

The composition of Example 1 was sprayed onto glass containers having a temperature of 170° F. After the bottles cooled to room temperature, the composition of Example 2 was applied to the glass bottles by silk screening indicia onto the glass through a 255 mesh screen. The ink was cured on the glass by exposure to a 9 mm. ultraviolet D bulb having a power of 600 watts per inch, manufactured by Fusion Inc., for about half a second.

EXAMPLE 6

The composition of Example 1 was sprayed on glass alcoholic beverage bottles at room temperature using a standard spray dispenser. The bottles were then exposed to a Varitemp Heat Gun from Master Appliance Corporation, Racine, Wis., for less than 60 seconds until they reached a surface temperature of 160 to 170° F. The ink composition of Example 2 was applied to the glass bottles by silk screening indicia onto the glass through a 255 mesh screen. The ink was cured on the glass by exposure to a 9 mm. ultraviolet D bulb having a power of 600 watts per inch, manufactured by Fusion Inc., for about half a second. The decorated bottles were allowed to cool to room temperature. The adhesion of the decorative indicia to the bottles was tested as follows, with the ratings excellent, good, fair, poor, unacceptable being correlated with grades 5B to 1B respectively, on the cross-cut tape test as defined by the ASTM, Designation No. 3359-87: Pasteurization −70° C., one hour Two bottles were immersed in water heated to a temperature of 70° C. for one hour. The adhesion on both bottles was excellent, i.e. corresponded to rating 5B on the cross-cut tape test.

While the invention has been described in connection with the preferred embodiment, it is not intended to limit the scope of the invention to the particular form set forth but, on the contrary, it is intended to cover such alternatives, modifications, and equivalents as may be included within the spirit and scope of the invention as defined by the appended claims.

We claim:

1. A method for applying decorative indicia to the surface of a vitreous article comprising the steps of:
   (a) applying to the surface of the article a primer composition consisting essentially of a solvent containing water, a silane coupling agent and a nonionic surfactant, whereby said silane in said water forms a silanol, capable of forming a chemical bond between the surface of the vitreous article and said silanol and a chemical bond between an organic, radiation, curable composition and said silanol,
   (b) after the primer composition is substantially dry, applying an organic radiation curable low molecular weight ink composition over the primer composition in a desired design,
   (c) curing the organic ink composition on the article by exposing it to radiation by which it is curable, thereby causing the coupling agent to form a chemical bond between both the surface of the vitreous article and the cured organic ink composition.

2. The method of claim 1 wherein composition comprises, by weight of the total composition:
   0.1–25% of the silane, and
   75–99.99% water.

3. The method of claim 2 wherein the silane contains a hydrophilic group which is hydroxy, hydroxypolyethyleneoxy, carboxylate, sulfonate, sulfate, phosphate, or amine.

4. The method of claim 1 wherein the mixture is applied by spraying.

5. The method of claim 2 wherein the composition additionally contains 0.01–20% by weight of the total composition of a nonionic surfactant.

6. The method of claim 5 wherein the nonionic surfactant is a polyethylene glycol glyceryl fatty acid ester.

7. The method of claim 6 wherein the polyethylene glycol glyceryl fatty acid ester is a monoester.

8. The method of claim 7 wherein the monoester has the general formula:

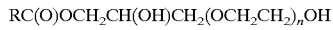

RC(O)OCH$_2$CH(OH)CH$_2$(OCH$_2$CH$_2$)$_n$OH wherein n is 2–200 and RC(O)— is a hydrocarbylcarbonyl group wherein R is an aliphatic radical having 7 to 30, preferably 8–20 carbon atoms.

9. The method of claim 8 wherein the monoester is PEG-5 glyceryl monostearate.

10. The method of claim 1 wherein the radiation curable composition is curable by ultraviolet radiation.

11. The method of claim 1 wherein the radiation curable composition comprises monomers, oligomers, or low molecular weight hompolymers, copolymers, terpolymers, graft copolymers, or block copolymers.

12. A method for pre-treating a vitreous article prior to application of organic radiation curable decorative indicia, comprising applying to said article a primer composition consisting essentially of, by weight of the total composition: 75–99.99% water, 0.01–20% of a silane coupling agent having the general formula:

II.

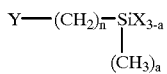

wherein n = 0–3
 a = 0–2

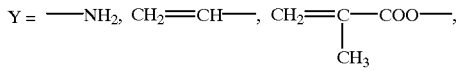

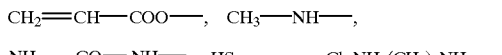

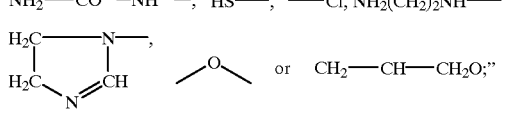

or

CH$_2$—CH—CH$_2$O;"

X is each independently —CH$_3$, —Cl, —OCOR', —OC$_2$H$_4$OCH$_3$, —(OC$_2$H$_4$)$_2$OCH$_3$ or —OR, where R is a C$_{1-20}$ straight or branched chain alkyl, and R' is a C$_{1-3}$ allyl or alkenyl, and Y is 1–3, 0.001–20% of a nonionic surfactant which is PEG-5 glyceryl monostearate.

\* \* \* \* \*

UNITED STATES PATENT AND TRADEMARK OFFICE
CERTIFICATE OF CORRECTION

PATENT NO. : 6,136,382  Page 1 of 1
DATED : October 24, 2000
INVENTOR(S) : Melvin E. Kamen, Dexin Luo and Ming Hu It is certified that error appears in the above-identified patent and that said Letters Patent is hereby corrected as shown below:

<u>Column 20,</u>
Lines 29-37, replace the phrase:

or

with the phrase:

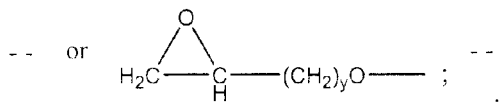

Signed and Sealed this

Sixteenth Day of December, 2003

JAMES E. ROGAN
*Director of the United States Patent and Trademark Office*